(No Model.)
R. KELLS.
CAR WHEEL.
No. 325,177. Patented Aug. 25, 1885.
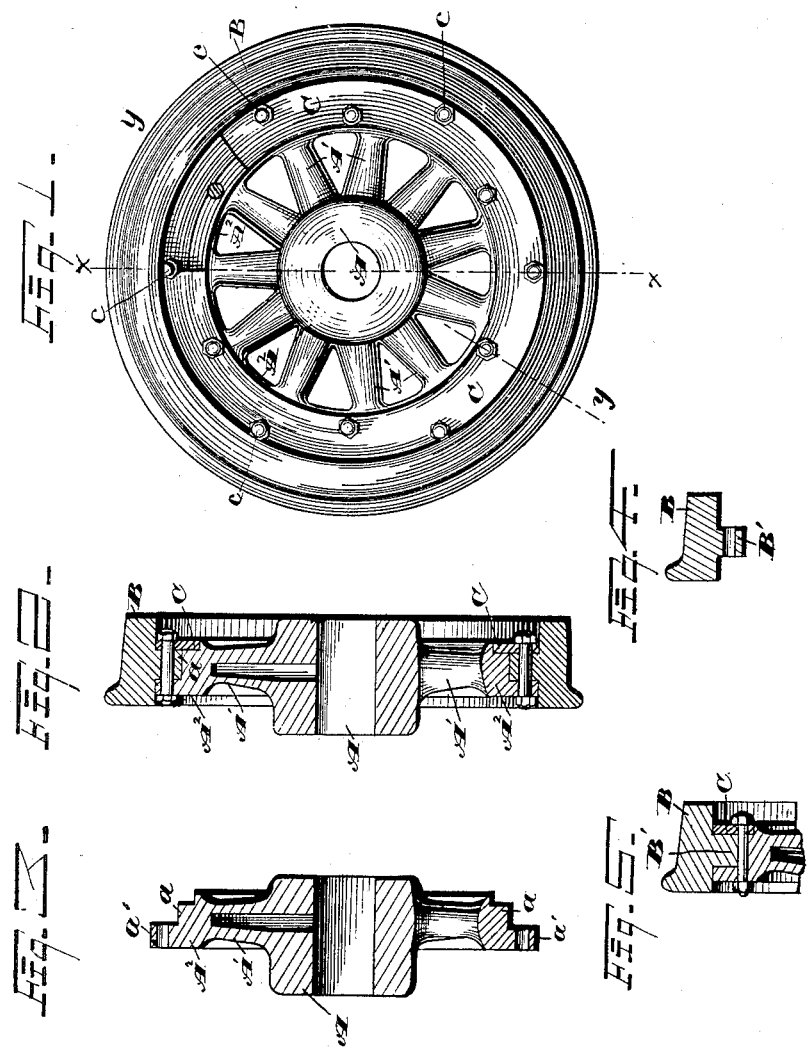
WITNESSES
Wm M. Monroe,
Geo. W. King
INVENTOR
Ross Kells
by Eggett & Eggett
Attorneys

UNITED STATES PATENT OFFICE.

ROSS KELLS, OF CLEVELAND, OHIO, ASSIGNOR TO THE PAIGE CAR WHEEL COMPANY, OF SAME PLACE.

CAR-WHEEL.

SPECIFICATION forming part of Letters Patent No. 325,177, dated August 25, 1885.

Application filed July 3, 1885. (No model.)

*To all whom it may concern:*

Be it known that I, ROSS KELLS, of Cleveland, in the county of Cuyahoga and State of Ohio, have invented certain new and useful Improvements in Car-Wheels; and I do hereby declare the following to be a full, clear, and exact description of the invention, such as will enable others skilled in the art to which it pertains to make and use the same.

My invention relates to improvements in car-wheels designed more especially for engine-trucks, in which a steel tire is shrunk onto a cast-metal center, the tire having an internal flange located opposite that portion of the tread that covers the rail-head, and the cast center having a shoulder to engage the inner face of the tire-flange, and having also a flange and so-called "retaining-ring" arranged to embrace the tire-flange and to support the body of the tire on either side of the tire-flange, the two flanges and retaining-rims being bolted together, as also are the cast center and retaining-ring, to the end that a wheel of great strength and durability is had, and that in case the tire should break it will be held in position by the bolts and parts embracing the tire-flange. The bolts securing the retaining-ring to the cast center cut into the edge of the tire-flange and serve as keys to prevent the tire from turning on the cast center, to the end that in case the tire is heated and expanded by the action of the brakes, so as to become loose on the cast center, it will be kept from turning on the cast center by means of the said bolts serving as keys. The cast center has preferably lateral openings dividing the casting into spokes, and the spokes are cored in a radial direction, to the end that a light cast center is had, and by reason of the dimensions of the spokes in a lateral direction great strength is had as against lateral strain, and by reason of the cored spokes much metal is saved and a casting of uniform density is had.

With these objects in view my invention consists in certain features of construction and in combination of parts, hereinafter described, and pointed out in the claims.

In the accompanying drawings, Figure 1 is a side elevation of my improved car-wheel, in which a section of the cast center is broken away to show the relative position of the inner bolt-holes. Fig. 2 is an elevation in section through the center of the wheel on the line $xx$, Fig. 1. Fig. 3 is an elevation in section through the center of the cast-iron center detached from the tire. Fig. 4 shows a transverse section of the tire. Fig. 5 is an elevation in section of the outer portion of the wheel on the line $zz$, Fig. 1.

The cast-metal center of the wheel consists of the hub A, the spokes A', the rim $A^2$, and the flange $A^3$, the parts being integral. The spokes are cored, as shown in Figs. 2 and 3, to save metal and to insure a casting of uniform density, the spoke-cores leading into the axial core of the hub, as shown. The rim $A^2$ is provided with the shoulders $a$ and $a'$.

B represents the tire, that is of steel, and has an internal flange, B', that is rectangular in cross-section, and located opposite that portion of the tread that covers the rail-head in ordinary running.

The tire is shrunk onto the cast center with the parts in the relative position as follows: The inner face of the flange B' engages the shoulder $a$, with the sides of the flanges $A^3$ and B' abutting, and the periphery of the flange $A^3$ engaging the body of the tire. After the tire is "shrunk on" in the position aforesaid the so-called "retaining-ring" C is placed in position. This ring is rectangular in cross-section, being broad in a radial direction, and has its edges dressed at right angles to the plane of the ring. When in position, the internal edge of the ring rests on the shoulder $a'$, and the external edge engages the body of the tire, the ring lying flatwise against the flange B', and against that portion of the rim $A^2$ that is between the shoulders $a$ and $a'$. The bolts $c$ pass through the flanges $A^3$ and B' and through the ring C. The bolts $c'$ pass in the main through the rim $A^2$ and the ring C; but the holes for these bolts are drilled so as to cut into the flange B' about a third of the size of the bolt, (see broken section, Fig. 1,) by reason of which the bolts $c'$, the primary object of which is to fasten together the cast center and the ring C, also serve as keys to prevent the tire from turning on the cast center.

In descending long heavy grades, when the brakes are necessarily applied with considerable force, the tire is sometimes heated and expanded to such a degree that it becomes loose on the cast center, and the grip of the brake would tend to turn the tire on the cast center and to shear the bolts $c$. Such turning of the tire, and consequent strain upon or shearing of the bolts $c$, is rendered impossible by means of the bolts $c'$ acting, as aforesaid, as keys; also, by reason of the larger contact-surface between the tire and tire-flange and the cast center and attachments, and by reason of the tire-flange being inclosed in the latter heat from the tire is so freely transmitted to the cast center that usually the expansion of parts is approximately equal, and it is only in extreme cases that the tire becomes loose on the center. In case the tire should break, it would be held securely by the bolts $c$, in which case not only the resistance that the bolts offer as against shearing is had, but the lateral pressure of the flange $A^3$ and ring C against the sides of the tire-flange is usually sufficient to hold the tire in case of breakage, so that the bolts $c$ are not subjected to excessive strain.

With the construction shown the tire-flange is held as in a vise, and by reason also of the larger bearing-surface between the parts, and the bolts arranged as described, it is thought that a maximum strength is attained at this part of the wheel.

The spokes, as shown in Figs. 2 and 3, are of considerable size in a lateral direction, by means of which the wheel is well braced as against the lateral strain to which engine-truck wheels are subjected.

A "web" or plate-center could be used in place of the spoke center shown, and the tire secured in the manner described; but a plate-center of the same strength would necessarily be much heavier than the spoke-center, the latter therefore being preferable.

By reason of the flange B' being located opposite that portion of the tread that in ordinary running covers the rail-head, and by reason of the tire being supported on either side of the tire-flange, respectively, by the flange $A^3$ and the ring C, there is no torsional strain whatever brought upon the tire, even when, as in passing curves, the tire engages the rail at the extreme of its lateral movement, and consequently there is no tendency to fracture the tire-flange at the line of union with the flange, and the result is that great durability is attained.

What I claim is—

1. In a car-wheel or wheel for an engine-truck, the combination, with a tire provided with an internal flange, the latter being rectangular in cross-section, and located opposite that portion of the tread that covers the rail-head, of a cast-metal center having cored spokes, and having a rim, $A^2$, flange $A^3$, shoulders $a$ and $a'$, and a retaining-ring, the parts being arranged substantially as set forth.

2. The combination, with a cast-metal center having a tire-flange and retaining-ring, and a tire having an internal flange, the parts being arranged substantially as indicated, of bolts for securing the retaining-ring to the cast center, and arranged to engage the inner edge of the tire-flange, to serve as keys to prevent the tire from turning on the cast center, substantially as set forth.

In testimony whereof I sign this specification, in the presence of two witnesses, this 25th day of June, 1885.

ROSS KELLS.

Witnesses:
 CHAS. H. DORER,
 ALBERT E. LYNCH.